V. A. WILSON.
LEVEL.
APPLICATION FILED APR. 19, 1911.
1,020,733.
Patented Mar. 19, 1912.
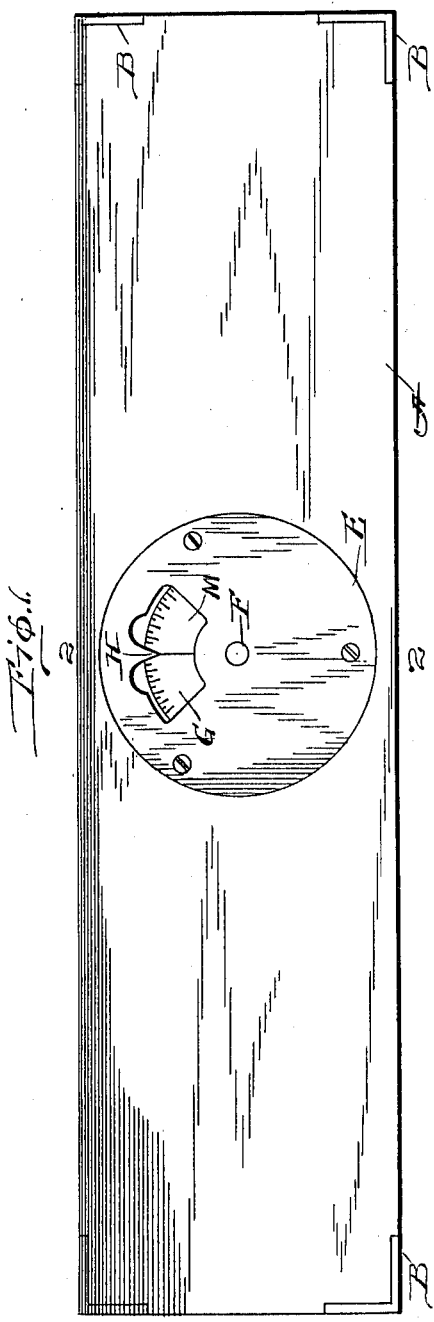
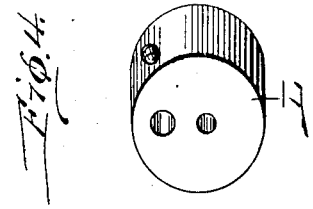
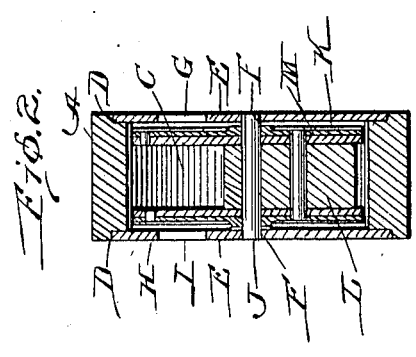
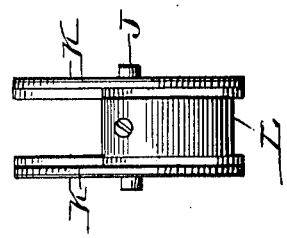
Witnesses
Inventor
Virgil A. Wilson
By
Attorney

UNITED STATES PATENT OFFICE.

VIRGIL A. WILSON, OF EAST POINT, GEORGIA.

LEVEL.

1,020,733. Specification of Letters Patent. Patented Mar. 19, 1912.

Application filed April 19, 1911. Serial No. 622,089.

*To all whom it may concern:*

Be it known that I, VIRGIL A. WILSON, a citizen of the United States, residing at East Point, in the county of Fulton and State of Georgia, have invented certain new and useful Improvements in Levels, of which the following is a specification.

My invention relates to improvements in levels and the leading object of my invention is the provision of a level which will be absolutely reliable for the intended purpose and which will be of simple, inexpensive and practical construction.

With this object in view, my invention consists of a level embodying novel features of construction and combinations of parts substantially as disclosed herein.

Figure 1 represents a side elevation of a level complete constructed in accordance with and embodying my invention. Fig. 2 represents a sectional view taken on the line 2—2 of Fig. 1. Figs. 3 and 4 represent detail views of the weighted dials and weight respectively.

My improved level is of extremely simple construction, consisting of the stock A provided with the metal protecting corners B, and formed centrally with the opening C, on each side of which are formed the annular recesses D, in which fit the plates E, formed with the openings F and the sight opening G, and the plates centrally of the sight opening are formed with the depending indicators or pointers H.

In the openings F and between the plates E is mounted the pin J upon which are placed the twin disks K, having secured thereto and to the pin J the weight L, and upon the disks K are secured the dials M, the indications on their faces being seen through the sight openings and in connection with the indicators H giving the desired level.

It will thus be seen that my level comprises very few parts which are entirly protected and it is evident that the dial has a very sensitive movement, and in connection with the pointer or indicator, will prove absolutely accurate and reliable in operation.

I claim:

1. A level, comprising a stock having a central opening therethrough, plates provided with sight openings and secured upon each side of said central opening, a depending pointer formed integral with the plates, and a weighted dial rotatably swung upon said plates and adapted to be observed through said sight openings in the plates.

2. A level, comprising a stock provided with a central opening therethrough, a rotating weighted dial mounted in said opening, plates secured upon the sides of the opening and having sight openings therein whereby said weighted dial may be observed, and a pointer depending from said plates and operating in conjunction with said dial.

3. A level, comprising a stock provided with a central opening therethrough, plates having sight openings secured upon each side of the opening, a pin in said plates, a weighted dial mounted on said pin, and an indicator formed on the plates and operating in conjunction with the dial.

4. A level, comprising a stock having a central opening therethrough, plates having sight openings secured upon each side of said central opening, depending indicators formed integral therewith, a pin secured between said plates, twin disks secured to said pin, a weight secured to said disks and pin, and dials secured upon said disks, said dials having indications thereon adapted to be observed through said sight openings in said plates.

In testimony whereof I affix my signature in presence of two witnesses.

VIRGIL A. WILSON.

Witnesses:
 N. S. CULPEPPER,
 GEO. A. CARTER.

---

Copies of this patent may be obtained for five cents each, by addressing the "Commissioner of Patents, Washington, D. C."